(12) United States Patent
Berghmans et al.

(10) Patent No.: US 6,538,042 B1
(45) Date of Patent: Mar. 25, 2003

(54) POROUS POLYMER PARTICLES

(75) Inventors: Michel Florentine Jozef Berghmans, Breda (NL); Kurt Ernest Irma Du Mong, Leefdaal (BE); Karel Cornelis Bleijenberg, Breda (NL); Guy Lode Magda Maria Verbist, Amersfoort (NL)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 09/786,807

(22) PCT Filed: Sep. 14, 1999

(86) PCT No.: PCT/EP99/06995

§ 371 (c)(1),
(2), (4) Date: Jun. 28, 2001

(87) PCT Pub. No.: WO00/15703

PCT Pub. Date: Mar. 23, 2000

(30) Foreign Application Priority Data

Sep. 16, 1998 (EP) .............................. 98203099

(51) Int. Cl.[7] .................................... C08J 9/22
(52) U.S. Cl. ................ 521/58; 521/60; 264/DIG. 9
(58) Field of Search ....................... 521/58, 60

(56) References Cited

U.S. PATENT DOCUMENTS

| 3,224,984 | A | * | 12/1965 | Roper et al. |
| 3,398,105 | A | * | 8/1968 | Roper et al. |
| 4,243,717 | A | * | 1/1981 | Gahmig |
| 5,229,429 | A | * | 7/1993 | Hahn et al. |
| 6,271,272 | B1 | * | 8/2001 | Carlier et al. |

* cited by examiner

*Primary Examiner*—Morton Foelak
(74) *Attorney, Agent, or Firm*—Suzanne Kikel

(57) ABSTRACT

Porous polyvinylarene particles having a apparent density $d_o$ of 600 to 200 kg/m$^3$, which particles contain a nucleating agent and 2.0% by weight or less, based on the amount of polyvinylarene, of a volatile organic blowing agent. The invention also relates to a process for the preparation of these particles as well as to the use of these particles in the preparation of expanded particles and foamed articles.

15 Claims, No Drawings

POROUS POLYMER PARTICLES

The present invention relates to porous polymer particles and a process for their preparation. In particular, the invention relates to porous polyvinylarene particles, which can be expanded to foamed articles.

For many years it has been known that particles of polyvinylarenes, such as polystyrene, can be rendered expandable and that the particles thus obtained can be used in the preparation of foamed articles. In this respect reference is made to, e.g., U.S. Pat. No. 2,681,321 which discloses a process in which polystyrene particles are exposed to liquid hydrocarbons and treated such that the liquid hydrocarbon is dispersed in the polystyrene particles. Particles thus prepared contain generally 4 to 8% wt of such liquid hydrocarbon blowing agent, such as butane, n-pentane or mixtures of pentanes. These particles can then be expanded to beads with a reduced density. Apparent densities for packaging particles typically are 20 to 60 kg/m$^3$. Once expanded, the particles are fused in a steam-heated mould to yield a foamed article of a desired shape.

One of the factors that influence the expansion of the polystyrene particles is the amount of hydrocarbon blowing agent. From Kirk Othmer, Encyclopedia of Chemical Technology, third edition, Volume 21, page 838, it can be read that the density of particles containing 5.7% wt n-pentane is typically 1080 kg/m$^3$, compared to a value of 1050 kg/m$^3$ for pure polystyrene beads and compared with a calculated density of 1020 kg/m$^3$ for a simple mixture in which the n-pentane is dissolved in polystyrene. If all pentane would be in voids the calculated density would be 1120 kg/m$^3$. Thus it has been suggested that part of the hydrocarbon blowing agent is present in little voids in the polystyrene. The skilled man will appreciate that the above densities are particle densities, which can be recalculated to apparent densities. A particle density of 1080 kg/m$^3$ corresponds to an apparent density of around 720 kg/m$^3$.

A drawback of the present practice is that during the transport and storage of the unexpanded particles the volatile organic blowing agent may evaporate from the particles, in particular from the voids. When the particles are transported and/or stored at varying temperatures and/or duration, the amounts of e.g. pentane retained may vary significantly. Apart from extra safety measures that have to be taken during transport, like gas-tight packaging, it will be appreciated that such a variation may have an effect on the resulting foam obtained after expansion.

Furthermore, the expansion process itself also causes that organic blowing agents originally present in the unexpanded particles are emitted into the environment. In order to reduce the emissions, complicated equipment has been developed to collect the emitted blowing agent for further handling, e.g. combustion. This equipment is to be installed in the facilities of the end-user of the particles, i.e. the customer who produces the foamed articles. This requires additional expertise and investments with these customers.

It has therefore become an objective of this invention to prepare polyvinylarene particles that can be expanded but do not have the safety, environmental and foam-related problems.

From GB patent No. 1,106,143 and PCT application No. WO 98/01489 expandable particles are known in which water is used as blowing agent. Although such particles circumvent some of the problems mentioned, one of the drawbacks of such particles is that water is less volatile than most conventional blowing agents. Therefore, specific measures need to be taken to stimulate the evaporation of water in order to arrive at a suitable expandability. In GB patent No. 1,106,143 specific reference is made to the fact that an additional volatile organic blowing agent needs to be added to obtain a satisfactory expandability.

So the inventive concept came up to prepare high-density expandable polyvinylarene particles, which could then be expanded using an innocuous blowing agent. However, the known high-density particles still contain a relatively high amount of volatile organic blowing agent. In this respect reference is made to U.S. Pat. No. 3,973,884 describing polymer beads with a relatively high density. The patent specifically describes that for the production of polystyrene particles for higher-density applications it is possible to use less of pentane or other blowing agent than has been used in particles for low-density applications. However, the patent continues that the difference is small and that in particles for low-density applications the pentane content may be 6–7.2% by weight, whereas for high-density applications polystyrene particles contain 5.8 to 7.0% by weight pentane. When these particles are expanded to relatively high densities, only a small amount of pentane will be needed for the expansion. Consequently, the resulting high density particles will still contain about 4.3 to 5.5% by weight pentane.

The current invention now provides a particle that avoids all drawbacks mentioned above. Accordingly, the present invention provides porous polyvinylarene particles having an apparent density $d_o$ of 600 to 200 kg/m$^3$, which particles contain a nucleating agent and 2.0% by weight or less, based on the amount of polyvinylarene, of a volatile organic blowing agent.

It will be evident that these particles have eradicated all above-mentioned problems. Because the amount of volatile organic blowing agent is 2.0% by weight or less, the majority, if not all, thereof is dissolved in the polymer matrix, so that it does not readily evaporates.

The porous polyvinylarene particles according to the present invention are typically pre-expanded particles. That entails the advantage that the particle already has a certain pore (cell) structure. Because the pre-expansion has been conducted such that the apparent density ranges from 600 to 200 kg/m$^3$, the pores are relatively small and the volume increase compared with the unexpanded particle is very small so that the transportation costs have not become prohibitive. Suitably, the apparent density $d_o$ ranges from 530 to 250 kg/m$^3$. Typically, this means that the volume of the pre-expanded particle may have increased by from about 1.5 to less than 3 times compared to the volume of the original unexpanded particle. This way, the volume increase has not become such that the transportation costs outweigh the advantages. Most suitably, the apparent density $d_o$ ranges from 450 to 350 kg/m$^3$.

The pores are suitably such that the average pore size is from 5 to 100 μm, preferably from 5 to 60, most preferably 10 to 40 μm. The average pore size is measured by cutting the particles half way through and imaging the samples with a JEOL JSM T220A Scanning Electron Microscope, using 10 keV beam energy, 8–38 mm continuously working distance, secondary electron imaging, and 5 nm resolution (JEOL is a trademark). The presence of a certain pore structure in the particles of the present invention allows them to be impregnated by an innocuous blowing agent.

The particles of the present invention contain a nucleating agent, which is a compound that promotes the formation of cells. Nucleating agents suitably exist as a separate phase in the polystyrene/blowing agent/nucleating agent system at the glass transition temperature of the polystyrene/blowing agent mixture. Advantageously, they are homogeneously distributed throughout the polyvinylarene matrix. Preferably, a nucleating agent has an average particle size from 100 nm to 10 μm, as measured by electronic microscopy, more preferably from 120 nm to 5 μm, most preferably from 140 nm to 1 μm. Nucleating agents are suitably used in an amount of 0.01 to 3% by weight, based on vinylarene, preferably in an amount of 0.05 to 2% by weight.

Examples of nucleating agents are finely dispersed inorganic compounds, organic compounds and polymer particles. Examples are carbonate compounds such as calcium carbonate, sulphate compounds such as barium sulphate and calcium sulphate, silicate compounds such as talc, clay, magnesium silicate, amorphous silica particles, zeolites, diatomaceous earth, oxides such as magnesium oxide and titanium oxide, mixtures of sodium bicarbonate with citric acid, organic bromine-containing compounds, naphthalene compounds, polycyclic aromatic hydrocarbons, carbon black, cokes, chars, graphite and diamond dust, paraffin and fatty acid derivatives such as stearate and palmitate compounds. Examples of suitable polymer particles are polyvinylchloride, polypropylene, polyethylene, acrylonitril butadiene styrene rubber, styrene butadiene rubber, styrene/maleic anhydride copolymer, cellulose. Further examples include polar polymers as described in e.g. WO 98/01501 which comprise e.g. starch, and starch modified by esterification or etherification, emulsifiers as described e.g. WO 98/01488 and WO 98/01489 which comprise bisalkylsulphosuccinates, sorbitol-$C_8$–$C_{20}$-carboxylates, and $C_8$–$C_{20}$-alkylxylene sulphonates. Particularly suitable as nucleating agent are polyethylene waxes having a weight average molecular weight of 500 to 5,000, which are typically finely divided through the polymer matrix in a quantity of 0.01–1.0% by weight, based on the amount of vinylarene, preferably from 0.1 to 0.5% by weight.

The amount of volatile organic blowing agent in the particle according to this invention is 2.0% by weight or less, based on the amount of polyvinylarene. Preferably, the amount of organic blowing agent is less than 1.5% by weight. More preferably the amount of volatile organic blowing agent is as low as possible, e.g. less than 1.0% by weight. Volatile organic blowing agents are well known in the art and are typically $C_2$–$C_6$ aliphatic organic blowing agents, such as propane, butane, pentane, hexane, cyclohexane or halogenated organic blowing agents. Most preferably, the particles are free of an organic blowing agent.

Advantageously, the polymer particles according to the present invention will contain less than 3.0% by weight, based on the amount of polyvinylarene, of water. This amount of water is typically just the maximum amount that remains after a conventional suspension polymerisation. Contrary to the teachings of GB patent No. 1,106,143 and PCT application No. WO 98/01489, no specific measures have to be taken to hold extra water in the particles. Preferably, the amount of water is less than 1.5% by weight, most preferably less than 0.5% by weight.

The porous particles according to the present invention can be prepared in several ways.

A possible way would be to pre-expand conventional expandable polyvinylarene particles to an apparent density of between 600–200 kg/m$^3$ and to subject these to vacuum and/or heating to evaporate the (relatively large) excess blowing agent. However, it is desirable to pre-expand expandable polyvinylarene particles containing-less blowing agent. Accordingly, it is preferred to prepare the porous particles according to the invention by using a process in which expandable polyvinylarene particles containing a nucleating agent and from 0.5 to 4.0% by weight of a $C_2$–$C_6$ organic blowing agent, based on polyvinylarene, are pre-expanded to a apparent density of 600 to 200 kg/m$^3$. More preferably, the porous particles according to the invention are prepared by using a process in which expandable polyvinylarene particles containing from 0.5 to 2.0% by weight of a volatile organic blowing agent, based on polyvinylarene, are pre-expanded to a apparent density of 600 to 200 kg/m$^3$.

Alternatively, it has been found that the porous polymer particles may also be prepared by expansion of the particles obtained by a process as described in Applicant's co-pending application No. 98203098.3. Herein, compact polyvinylarene polymer particles are impregnated by an inorganic $N_2$- and/or $O_2$-containing gas at a temperature below 95° C. and at a pressure of 100 to 2,000 kPa gauge, to yield expandable polyvinylarene particles.

Another possibility is to prepare the porous particle of the present invention "in-situ". Hereto, styrene is bulk polymerised in an extruder in the presence of a blowing agent. When the hot polymer melt exits the extruder, the blowing agent will be released to effect pre-expansion to a density of 600–200 kg/m$^3$. The slightly expanded strands of polymer are then cut to obtain the particles of the present invention. In this technique, it will be preferred to use carbon dioxide as blowing agent or so-called chemical blowing agents. Chemical blowing agents are compounds that release gaseous components upon heating. The latter compounds are usually solid and are particularly used in bulk polymerisation techniques. Examples are carbon dioxide- or nitrogen-liberating solid compounds such as azodicarbonamide.

Expandable polyvinylarene particles from which the porous particles according to the present invention may be obtained, can be prepared by various methods. These include bulk polymerisation, solution polymerisation and suspension polymerisation techniques. The polymerisation reaction itself may be initiated thermally, via free radical polymerisation or via anionic polymerisation. The blowing agent may be added before, during or after the polymerisation. Apart from hydrocarbons, e.g. $C_2$–$C_6$ hydrocarbons or halogenated hydrocarbons, and water, other blowing agents may also be used. Examples are inorganic blowing agents, such as carbon dioxide or, in the case of Applicants co-pending application No. 98203098.3, inorganic $N_2$- and/or $O_2$-containing gases. Further examples are chemical blowing agents.

In bulk techniques, the polymerisation is carried out in a conventional way to obtain small particles (nibs) which have been impregnated with a blowing agent. In the present invention, this impregnation is preferably carried out with 0.5 to 4% by weight of a $C_{2-6}$ organic blowing agent, more preferably with 0.5 to 2.5% by weight of a $C_{2-6}$ organic blowing agent. A nucleating agent may be added before or during the bulk polymerisation.

Advantageously, the expandable particles are prepared in a suspension polymerisation process in which vinylarene is polymerised in aqueous suspension in the presence of a nucleating agent and from 0.1 to 1% by weight of a free radical initiator, wherein a $C_{2-6}$ organic blowing agent is added before, during or after the polymerisation, wherein the amount of blowing agent is from 0.5 to 4% by weight, based on the amount of vinylarene, to yield expandable polyvinylarene particles. The nucleating agent may be added before or during the polymerisation, preferably before. More preferably, the expandable particles are prepared in such a process, wherein the amount of blowing agent is from 0.5 to 2.5% by weight, based on the amount of vinylarene. For the suspension polymerisation many methods and initiators are known. In this respect reference is made to, e.g., U.S. Pat. Nos. 2,656,334 and 3,817,965, and European patent application No. 488,040. The initiators mentioned therein are also applicable in the preparation of the particles of the present invention. Particularly suitable are organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl perbenzoate, t-butyl peracetate, t-butyl perisobutyrate, hydroperoxides and dihydrocarbyl peroxides, such as those containing $C_{3-10}$ hydrocarbyl moieties, including di-isopropyl benzene hydroperoxide, di-t-butyl peroxide, t-butylperoxy-(2-ethylhexyl)carbonate, dicumyl peroxide or combinations thereof. Other initiators different from peroxy compounds are also possible, e.g., $\alpha,\alpha'$-azobis-isobutyronitrile.

The suspension polymerisation is suitably carried out in the presence of suspension stabilisers. Suitable suspension stabilisers are well known in the art and comprise poly(vinyl alcohol), gelatine, agar, polyvinyl pyrrolidine, polyacrylamide, inorganic stabilisers such as alumina, bentonite, magnesium silicate or phosphates, like tricalciumphosphate and/or disodiumhydrogen phosphate, optionally in combination with any of the stabilising compounds mentioned earlier. The amount of stabiliser may suitably vary from 0.1 to 0.9% wt, based on the weight of the aqueous phase.

The suspension polymerisation is suitably carried out at two temperature stages, in which the temperature in the first stage is from 85 to 110° C. and in the second stage is from 115 to 140° C.

The expandable polyvinyarene particles suitable have an average particle size of 0.2–3.0 mm. In order to pre-expand them, these particles will be exposed to a temperature where the polyvinylarene will plasticize, and cause the evaporation of the blowing agent. This will result in a small pre-expansion of the expandable polyvinylarene particles into the particles of the present invention. This pre-expansion can be carried out by several methods. Suitable well known methods include the use of oil baths, infra red or microwaves or steam. Steam may be used of temperatures of 100 to 168° C. at pressures of 0 to 600 kPa gauge, depending on the presence of additives and/or other polymers in the expandable polyvinylarene particle. In the case of polystyrene, it is preferred to use saturated steam of a temperature of 100–125° C. at pressures of 0 to 230 kPa gauge. The expandable particles may also be pre-expanded by exposing them to warm water. This method is preferred. In this embodiment the water suitably has a temperature of from 60 to 100° C. and the exposure has a duration of 5 to 120 min. The most preferred method for pre-expansion in the present invention is the use of hot air, having a temperature of from 90–200° C., preferably from 95–160° C. and most preferably from 100° C.–140° C. The exposure preferably has a duration of up to 3 hours.

The vinylarene comprised in the porous polymer particles of the present invention consists preferably mainly of styrene. The polyvinylarene may contain up to 10% mole of another vinyl-group containing monomer, such as acrylonitril, acrylic or methacrylic acid or esters, substituted styrene, such as chlorostyrene, or α-methyl styrene, or divinylbenzene. However, preferably the vinylarene in the polyvinylarene consists for more than 99% mole of styrene. More preferably, the polyvinylarene is polystyrene.

It may be advantageous to polymerise the vinylarene in the presence of other polymers such as polyphenylene oxide. These other polymers may be added before or during the polymerisation reaction, or may be formed in-situ previous to the start of polymerisation of vinylarene. Suitable polyphenylene oxides have been described in EP-A-350137, EP-A-403023 and EP-A-391499. The polyphenylene oxide is preferably present in an amount between 1 and 30 wt %, based on the amount of vinylarene, and may improve the rigidity of the polyvinylarene polymer.

The expandable and/or porous polyvinylarene particles may contain various conventional additives. Such additives include chain transfer agents and cross-linking agents. Suitable examples of chain transfer agents are $C_{2-15}$ alkyl mercaptans such as n-dodecyl mercaptan, t-dodecyl mercaptan, t-butyl mercaptan and n-butyl mercaptan. Other agents are pentaphenyl ethane and the dimer of (α-methyl styrene. Examples of cross-linking agents are butadiene and divinylbenzene.

The expandable and/or pre-expanded particles may also contain anti-static additives, flame retardants such as hexabromocyclododecane, dyes, filler material, stabilisers, plasticizers such as white oil, and lubricants. The particles are suitably coated with coating compositions comprising silicones, silicates metal or glycerol carboxylates. Suitable carboxylates are glycerol mono-, di- and tri-stearate, zinc stearate, and mixtures thereof. Examples of such compositions have been disclosed in GB patent No. 1,409,285. Instead of stearate, one may also usecitrate or palmitate. The coating compositions have been applied to the particles via dry-coating in a ribbon blender or via a slurry or solution in a readily vaporising liquid.

Contrary to conventional high density polyvinylarene particles, the particles according to present invention are practically non-expandable. This means that when exposed to conventional expansion conditions, i.e. exposure to saturated steam over atmospheric pressure to reach a final temperature of 105° C. for 30 seconds, the particles of the present invention expand to an apparent density which is at most three times lower than $d_o$. Preferably, the particles according to the present invention expand under these conditions to a density of at most two times lower than $d_o$.

In order to render the particles of the present invention sufficiently expandable, they are impregnated by a blowing agent. Accordingly, the present invention also provides the use of the porous particles according to this invention in the preparation of expanded particles and foamed articles. Preferably, the blowing agent to be impregnated is an inorganic gas. As already explained above, the volume of the pre-expanded particle may have increased by from about 1.5 to less than 3 times compared to the volume of the original unexpanded particle. This ensures that the pores in the pre-expanded particle are of such a size that a reasonable amount of inorganic gas can be impregnated into the voids of the particles. "Inorganic" means that the impregnating gases may contain at most 1% by volume, based on the volume of the gas, of organic compounds, preferably at most 0.5% by volume. Most preferably, the inorganic gases do not contain any organic compounds.

An example of a suitable inorganic gas is carbon dioxide. However, this interferes with the polyvinylarene matrix. Like many commercial blowing agents it dissolves to some extent into the polymer matrix. This means that for some applications it will have to be removed with effort in view of potential negative effects, e.g. in the field of safety, health or toxicology. Carbon dioxide, also being a well-known green house gas, is therefore not preferred. Preferred are inorganic gases that have no such a negative effect and that show less interaction with the polymer matrix. Examples of such gases are inorganic $N_2$- and/or $O_2$-containing gases, helium, neon and argon. More preferably, the inorganic gas used for the impregnation is selected from inorganic $N_2$- and/or $O_2$-containing gases. These gases suitably contain more than 90% by volume, based on the volume of the gas, of $N_2$ and/or $O_2$, more suitably more than 95% by volume. Most preferably, the gas is nitrogen or air. Not only do these gases hardly interfere with the polymer matrix, but they are also effective and cheap and have no negative environmental or health impact.

The impregnation can be conducted in many ways. However, it is preferred to impregnate the particles according to this invention by an inorganic gas by exposing the particles to the gas at temperatures ranging from 0 to 95° C. In this way the voids in the particles are filled with the gas without the polyvinylarene being heated such that it deforms. Such deformation might have a detrimental effect on the structure and properties of the voids and thereby it would have a negative impact on the expandability of the resulting impregnated particles. Moreover, the low temperature ensures that the particles remain free flowing and do not stick to each other, which might occur if the impregnation would be conducted at higher temperatures. Preferred temperature ranges are from 0 to 50° C., more preferably from 10 to 30° C. Most preferably, the temperature used is room temperature.

The impregnation is suitably such that in the pores of the porous particle a pressure of 100 to 1,500 kPa gauge is achieved. Preferred pressures in the pores are between 200 and 1,000 kPa gauge, more preferably between 300 and 800 kPa gauge. Lower pressures than 100 kPa gauge would mean that the voids would merely be filled with gas, e.g. nitrogen or air, at about atmospheric pressure. Such a replacement would result in a insufficient expansion, if any. Pressures higher than 1,500 kPa gauge are possible, but these are undesirable for economical and safety reasons. The external pressure applied, required to establish the desired pressure in the pores, is preferably of 100 to 2,000 kPa. Although it is possible to use higher external pressures, this would require better equipped pressure vessels and it would make sampling more difficult. Preferably, the maximum external pressure employed is 1,500 kPa. Suitably, the external pressure applied is the same as the desired pressure in the pores of the porous particle.

After impregnation with a blowing agent, the impregnated particles obtained are suitably expanded to a apparent density of at least three times lower than $d_o$. Preferably, the impregnated particles are expanded to a density of at least 5 times lower than $d_o$. Although the expansion can be conducted to any apparent density desired, it is practical to conduct the expansion to an apparent density which is up to 20 times, more preferably up to 40 times lower than $d_o$. The expansion can be carried out by the same methods as described for the pre-expansion. Preferred is the use of steam as expansion method. The expanded particles are subsequently fused together in a mould to yield foamed articles.

The present invention will be further illustrated by the following, non limiting, examples.

EXAMPLES

All apparent densities were measured in accordance with the following method:

A cylindrical cup of 1000 $cm^3$+/−2 $cm^3$ capacity, having an inside diameter of 66 mm and a height of 293 mm was weighed to the nearest 0.1 gram (atmospheric pressure, room temperature). Subsequently, the cup was filled with polyvinylarene particles. A perfectly flat metal scrapper was used to tap three times against the side of the cup and subsequently to scrape off the excess material on the top of the cup, without shaking the cup. The material in the cup was weighed to the nearest 0.1 gram and the weight of the polyvinylarene particles in grams of 1 $cm^3$ was calculated and converted to $kg/m^3$.

All pentane contents were measured with gas chromatography using N-hexane as the internal standard.

All water contents were measured in accordance with the Karl Fischer method.

Example 1

Preparation of EPS Particles

Polystyrene particles were prepared by a suspension polymerisation process. Hereto, 4,000 gram demineralised water (4 litre), 3680 gram styrene (4 litre), conventional suspension stabilisers, 0.25% wt, based on the weight of styrene, of a polyethylene wax, and 0.25% wt white oil were mixed at a stirring rate of 475 rpm. The polymerisation was started by raising the temperature to 86° C. and by addition of peroxide initiators (0.65% wt). In addition, 0.05% wt dimer of α-methylstyrene was added. After around 6 hours, 81 gram pentane (mixture of 75% wt n-pentane and 25% wt isopentane) was added and the temperature was raised to around 120° C. where it was kept during 2 hours. After finishing the polymerisation, the reaction mixture was cooled.

The resulting polystyrene particles contained 2.1% by weight pentane, based on the weight of the polystyrene, they had a particle size in the range of 0.4–0.7 mm, and a polyethylene wax content of 0.25% by weight, based on the weight of polystyrene.

Pre-expansion

The polystyrene particles were placed in a water bath of 100° C. for 900 seconds. Subsequently, they were dried at 60° C. for 15 minutes. The resulting pre-expanded particles had a bulk density $d_o$ of 500 $kg/m^3$, a pentane content of 1.77% by weight, based on the weight of polystyrene, and a water content of 0.2% by weight.

Expansion

The pre-expanded polystyrene particles were placed in a KURTZ KV450 batch steam expander, using saturated steam over atmospheric pressure to reach a final temperature of 105° C. (KURTZ is a trademark). The expansion time was 30 seconds. The particles expanded to a bulk density d of 362 $kg/m^3$. The calculated ratio $d_o/d$ was 1.4.

Example 2

The procedure according to Example 1 was repeated with the exception that the polystyrene particles were pre-expanded in a KURTZ KV450 batch pre-expander, using a steam pressure of 80 kPa gauge at a temperature of 117° C. for 15 seconds.

The resulting pre-expanded particles had a bulk density $d_o$ of 536 g/l, a pentane content of 1.92% by weight, based on the weight of polystyrene, and a water content of 0.1% by weight.

After being placed in the KURTZ KV450 batch steam expander the pre-expanded particles expanded to a bulk density d of 427 $kg/m^3$. The calculated ratio $d_o/d$ was 1.3.

Example 3

The procedure according to Example 1 was repeated with the exception that the polystyrene particles were pre-expanded in a KURTZ KV450 batch pre-expander, using a steam pressure of 80 kPa gauge, at a temperature of 117° C. for 45 seconds. The resulting pre-expanded particles had a bulk density $d_o$ of 256 kg/m$^3$, a pentane content of 1.77% by weight, based on the weight of polystyrene, and a water content of 0.1% by weight. After being placed in the KURTZ KV450 batch steam expander the pre-expanded particles expanded to a bulk density d of 124 kg/m$^3$. The calculated ratio $d_o/d$ was 2.1.

Example 4

The procedure according to Example 1 was repeated with the exception that in the suspension 62 gram pentane was used. The resulting polystyrene particles contained 1.6% by weight pentane and had a particle size in the range of 0.7–0.9 mm. The amount of polyethylene wax was 0.25% by weight.

Subsequently, the polystyrene particles were pre-expanded in a KURTZ KV450 batch pre-expander, under a pressure of 40 kPa gauge at a temperature of 109° C. for 20 seconds. The resulting pre-expanded particles had a bulk density $d_o$ of 350 kg/m$^3$, a pentane content of 1.1% by weight, based on the weight of polystyrene, and a water content of 0.1% by weight.

Subsequently, the pre-expanded particles were placed in the KURTZ KV450 batch steam expander for 30 seconds using saturated steam over atmospheric pressure to reach a final temperature of 115° C. instead of 105° C. The particles expanded to a bulk density d of 125 kg/m$^3$. The calculated ratio $d_o/d$ was 2.8.

Example 5

Preparation of EPS Particles

Polystyrene particles were prepared by a suspension polymerisation process. Hereto, 67,7 kilogram demineralised water (67.7 litre), 79,34 kilogram styrene (86.4 litre), conventional suspension stabilisers, 0.5% wt, based on the weight of styrene, of a polyethylene wax were mixed at a stirring rate of 170 rpm. The polymerisation was started by raising the temperature to 86° C. and by addition of peroxide initiators (0.57% wt). After around 4,5 hours, 2,5 litre of pentane (mixture of 75% wt n-pentane and 25% wt isopentane) was added and the temperature was raised to around 120° C. where it was kept during 2 hours. After finishing the polymerisation, the reaction mixture was cooled.

The resulting polystyrene particles contained 1.66% by weight pentane, based on the weight of the polystyrene, they had a particle size in the range of 0.4–0.7 mm, and a polyethylene wax content of 0.5% by weight, based on the weight of polystyrene.

Pre-expansion

The polystyrene particles were pre-expanded by subjecting them to hot air having a temperature of 97–100° C. for 2700 seconds. The resulting pre-expanded particles had a bulk density $d_o$ of 428 kg/m$^3$, a pentane content of 1.29% by weight, based on the weight of polystyrene, and a water content of 0.2% by weight.

Expansion

The pre-expanded polystyrene particles were placed in a KURTZ KV450 batch steam expander, using saturated steam over atmospheric pressure to reach a final temperature of 105° C. The expansion time was 30 seconds. The particles expanded to a bulk density d of 316 kg/m$^3$. The calculated ratio $d_o/d$ was 1.4.

Example 6

Preparation of EPS Particles

Polystyrene particles were prepared by a bulk polymerisation process followed by a suspension polymerisation process. Hereto, 69 liters of styrene, 354 gram of maleic anhydride and 1000 g of starch were mixed at a stirrer rate of 175 rpm. The polymerisation was started by raising the temperature to 120° C. and by addition of peroxide initiators (0.025% wt). After 90 minutes, the mixture was cooled down to 60° C. and transferred to another vessel.

Herein, 91 kilogram demineralised water (91 litre), the obtained bulk polymerisation mixture and conventional suspension stabilisers, were mixed at a stirring rate of 175 rpm. The polymerisation was started by raising the temperature to 86° C. and by addition of peroxide initiators (0.30% wt). After around 5 hours, the temperature was raised to around 120° C. where it was kept during 1.5 hours. After finishing the polymerisation, the reaction mixture was cooled.

The resulting polystyrene particles contained 2.6% by weight water, based on the weight of the polystyrene, they had a particle size in the range of 0.9–1.6 mm.

Pre-expansion

The polystyrene particles subjected to hot air having a temperature of 127° C. for 100 seconds. The resulting pre-expanded particles. had a bulk density $d_o$ of 330 kg/m$^3$.

Expansion

The pre-expanded polystyrene particles were placed in a KURTZ KV450 batch steam expander, using saturated steam over atmospheric pressure to reach a final temperature of 117° C. instead of 105° C. The expansion time was 30 seconds. The particles expanded to a bulk density d of 298 kg/m$^3$. The calculated ratio $d_o/d$ was 1.1.

Comparative Experiment

Expandable polystyrene particles were prepared according to the method of Example 1, with the exception that 267 gram pentane was used instead of 81 gram. The resulting polystyrene particles contained 6.2% by weight pentane, they had a particle size in the range of 0.4–0.7 mm and contained 0.25% by weight of a polyethylene wax.

Subsequently, the polystyrene particles were pre-expanded by placing them in a water bath with a temperature of 70° C. for 600 seconds. The resulting pre-expanded particles had a bulk density $d_o$ of 520 kg/r$^3$, a pentane content of 5.9% by based on the amount of vinylarene and a water content of 0.15% by weight.

After being placed in the KURTZ KV450 batch steam expander under the conditions of example 1, the particles expanded to a bulk density d of 14.9 kg/m$^3$. The calculated ratio $d_o/d$ was 34.9.

What is claimed is:

1. Porous polyvinylarene particles prepared from unexpanded polyvinylarene particles, said porous polyvinylarene particles having a certain pore structure and an apparent density $d_o$ of 600 to 200 kg/m$^3$, and which porous particles contain a nucleating agent and 2.0% by weight or less, based on the amount of polyvinylarene, of a volatile organic blowing agent, and which porous particles have a volume increase that is from about 1.5 to less than 3 times compared to the volume of said unexpanded particles.

2. Particles according to claim 1, which have an apparent density $d_o$ of 530 to 150 kg/m$^3$.

3. Particles according to claim 1, which contain less than 3.0% by weight, based on the amount of polyvinylarene, of water.

4. Particles according to claim 1, which when exposed to saturated steam over atmospheric pressure to reach a final temperature of 105° C. for 30 seconds, expand to an apparent density which is at most three times lower than $d_o$.

5. Particles according to claim 1, said pore structure having pores with an average pore size of 5 to 100 μm.

6. Particles according to claim 1, in which the polyvinylarene is polystyyrene.

7. Process for the preparation of porous polyvinylarene particles, in which expandable polyvinylarene particles containing a nucleating agent and from 0.5 to 4% by weight of a $C_{2-6}$ organic blowing agent, based on polyvinylarene, are pre-expanded to an apparent density of 600 to 200 kg/m$^3$ to form a certain pore structure in said porous polyvinylarene particles and which porous polyvinylarene particles contain 2.0% by weight or less of said $C_{2-6}$ organic blowing agent, based on the amount of polyvinylarene.

8. Process according to claim 7 in which the expandable polyvinylarene particles are prepared in a suspension polymerisation process in which vinylarene is polymerised in aqueous suspension in the presence of a nucleating agent and from 0.1 to 1% by weight of a free radical initiator, wherein a $C_{2-6}$ organic blowing agent is added before, during or after the polymerisation, wherein the amount of blowing agent is from 0.5 to 4% by weight, based on the amount of vinylarene, to yield expandable polyvinylarene particles.

9. Process according to claim 7, in which the pre-expansion of the expandable polyvinylarene particles is effected by exposing them to hot air.

10. Process according to claim 9, in which the hot air has a temperature of from 90 to 200° C.

11. Use of the particles of claim 1 in the preparation of expanded particles and foamed articles.

12. Particles according to claim 1, which further comprise an inorganic gas.

13. Particles according to claim 12, which inorganic gas contains at most 1% by volume, based on the volume of the gas, of organic compounds.

14. Process according to claim 7 in which the porous polyvinylarene particles are further impregnated with an inorganic gas for subsequent expansion and/or molding processes.

15. Process according to claim 14 wherein said inorganic gas contains at most 1% by volume, based on the volume of the gas, of organic compounds.

* * * * *